United States Patent
Moore et al.

(10) Patent No.: US 9,547,620 B2
(45) Date of Patent: Jan. 17, 2017

(54) COMPUTING DEVICE INCLUDING A PRINTED CIRCUIT BOARD AND A DOCKING PORT

(75) Inventors: Earl W Moore, Cypress, TX (US); Paul N Walker, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 438 days.

(21) Appl. No.: 14/356,402

(22) PCT Filed: Dec. 7, 2011

(86) PCT No.: PCT/US2011/063700
§ 371 (c)(1),
(2), (4) Date: May 6, 2014

(87) PCT Pub. No.: WO2013/085504
PCT Pub. Date: Jun. 13, 2013

(65) Prior Publication Data
US 2014/0325112 A1    Oct. 30, 2014

(51) Int. Cl.
*G06F 1/16*     (2006.01)
*H05K 5/00*    (2006.01)
*H05K 7/00*    (2006.01)
*G06F 13/40*   (2006.01)

(52) U.S. Cl.
CPC ......... *G06F 13/4068* (2013.01); *G06F 1/1616* (2013.01); *G06F 1/1632* (2013.01); *G06F 1/1656* (2013.01)

(58) Field of Classification Search
CPC .. G06F 13/4068; G06F 1/1616; G06F 1/1632; G06F 1/1656
See application file for complete search history.

(56) References Cited

U.S. PATENT DOCUMENTS

| | | | |
|---|---|---|---|
| 5,030,140 A * | 7/1991 | Sugiyama | H01R 23/6873 439/607.35 |
| 6,814,583 B1 | 11/2004 | Young et al. | |
| 7,330,923 B2 | 2/2008 | Wenstrand et al. | |
| 7,508,658 B2 | 3/2009 | Ling | |
| 7,583,495 B2 | 9/2009 | Carnevali | |
| 7,738,247 B2 | 6/2010 | Choi | |
| 2003/0107876 A1 | 6/2003 | Suzki | |
| 2005/0026499 A1* | 2/2005 | Choi | H01R 13/2442 439/607.01 |
| 2005/0264987 A1* | 12/2005 | Krancher | G06F 1/1632 361/679.41 |
| 2008/0112120 A1* | 5/2008 | Huang | G06F 1/1616 361/679.41 |

(Continued)

FOREIGN PATENT DOCUMENTS

TW    M371250    12/2009

OTHER PUBLICATIONS

International Searching Authority, International Search Report and Written Opinion, Appln No. PCT/US2011/063700, date of mailing Aug. 28, 2012, 9 p.

*Primary Examiner* — Yuriy Semenenko
(74) *Attorney, Agent, or Firm* — HP Patent Department

(57) ABSTRACT

A computing device including a printed circuit board. A docking port coupled to the printed circuit board. Wherein the docking port can receive a docking connector that either passes through an aperture in the printed circuit board or passes by the edge of the printed circuit board.

14 Claims, 7 Drawing Sheets

(56) References Cited

U.S. PATENT DOCUMENTS

| | | |
|---|---|---|
| 2009/0043936 A1 | 2/2009 | Yang et al. |
| 2009/0073642 A1* | 3/2009 | Jubelirer ............... G06F 1/1632 |
| | | 361/679.01 |
| 2010/0002371 A1 | 1/2010 | Lee |
| 2012/0169614 A1* | 7/2012 | Oberpriller ........... G06F 1/1656 |
| | | 345/173 |

* cited by examiner

COMPUTING DEVICE INCLUDING A PRINTED CIRCUIT BOARD AND A DOCKING PORT

BACKGROUND

Computers may be made portable by including for example a battery and a display. However a portable computing device may leave out components. A docking station may include components that are not included in the portable computing device. The docking station may be coupled to the portable computing device.

BRIEF DESCRIPTION OF THE DRAWINGS

Some embodiments of the invention described with respect to the following figures.

DETAILED DESCRIPTION

Figure 1A:
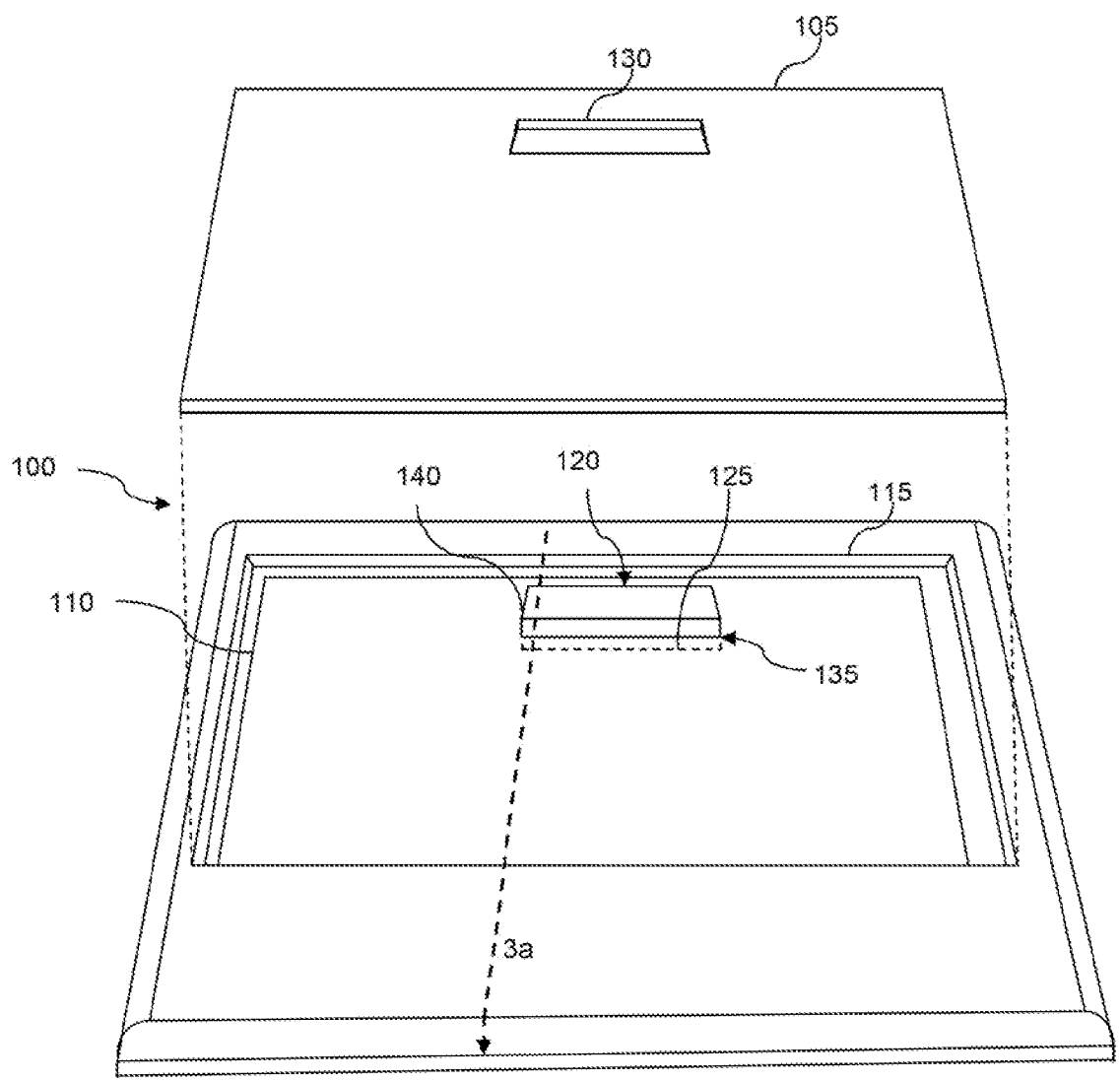
FIGS. 1a and 1b is a computing device including a docking port according to an example implementation.

Portable computing devices can connect to a docking station. The docking station may provide power to charge a battery in the portable computing device. The docking station may also connect to components in the portable computing device such as an input/output (I/O) hub. The docking station may provide additional ports to connect peripherals to the portable computing device through the docking station if the portable computing device is connected to the docking station.

The docking station may include a docking connector that is received by the docking port of the portable computing device. Since the portable computing device is removed and reinstalled on the docking station the docking port and the docking connector should have a contact swipe that is of a length that the docking connector can be in various positions of insertion into the docking port and all the signal lines are making electrical contact.

A docking port may be on the bottom of a portable computing device, if the portable computing device is a notebook computer for example. As portable computing devices get thinner a docking connector on the bottom of the portable computing device has to become smaller to fit between the top and bottom of the housing of the portable computing device. The printed circuit board also takes up space between the top and bottom of the housing and the docking connector may be mounted to the printed circuit board. Reducing the thickness of a portable computing device causes the thickness of the docking connector to be reduced to fit between the printed circuit board and the bottom of the portable computing device. In one example from the bottom of the portable computing device to the printed circuit board may be less than 3 millimeters. Since the docking port contacts may not be flush with the bottom of the portable computing device the maximum amount of contact swipe would be less than the 3 millimeters by the distance the docking port contacts are recessed into the bottom of the portable computing device. As the contact swipe is reduced the chances of the contacts in the docking connector of the portable computing device being in contact with some but not all of the contacts in the docking station connector.

In one implementation a computing device can include a printed circuit board with an aperture through the printed circuit board. The computing device can include a docking port which is at least partially in the aperture through the printed circuit board. The docking port can receive a docking connector from a docking station. If the computing device is docked to the docking station the docking connector passes through the aperture.

In another implementation a computing device can include a housing with a top and a bottom. The computing device can include a printed circuit board between the top and the bottom. The printed circuit board can include an aperture between the top and an opening in the bottom.

In another implementation a computing device can include a housing with a top and a bottom. The computing device can include an opening on the bottom. The computing device can include a printed circuit board with an edge and the printed circuit board is between the top and the bottom. A docking port can be attached to the edge of the printed circuit board and aligned with the opening.

With reference to the figures, FIG. 1a is a bottom view of a computing device including a docking port according to an example implementation. The portable computing device 100 can include a printed circuit board 110. The portable computing device 100 includes a bottom 105 of a housing 115. The bottom panel 105 may be removable. The bottom 105 of the portable computing device 100 may include an opening 130. The opening 130 can align with the docking port 120 to allow a docking connector to connect to the docking port 120 through the opening 130.

The printed circuit board 110 includes an aperture 135 through the printed circuit board 110. A docking port 120 can be at least partially in the aperture 135 through the printed circuit board 110. For example a top portion of the docking port 125 is above of the printed circuit board while a bottom portion of the docking port 140 is below the docking port 120. The docking port 120 can receive a docking connector from a docking station. If the docking port 120 is connected to a docking connector on a docking station the connector can pass through the aperture.

Figure 1B:
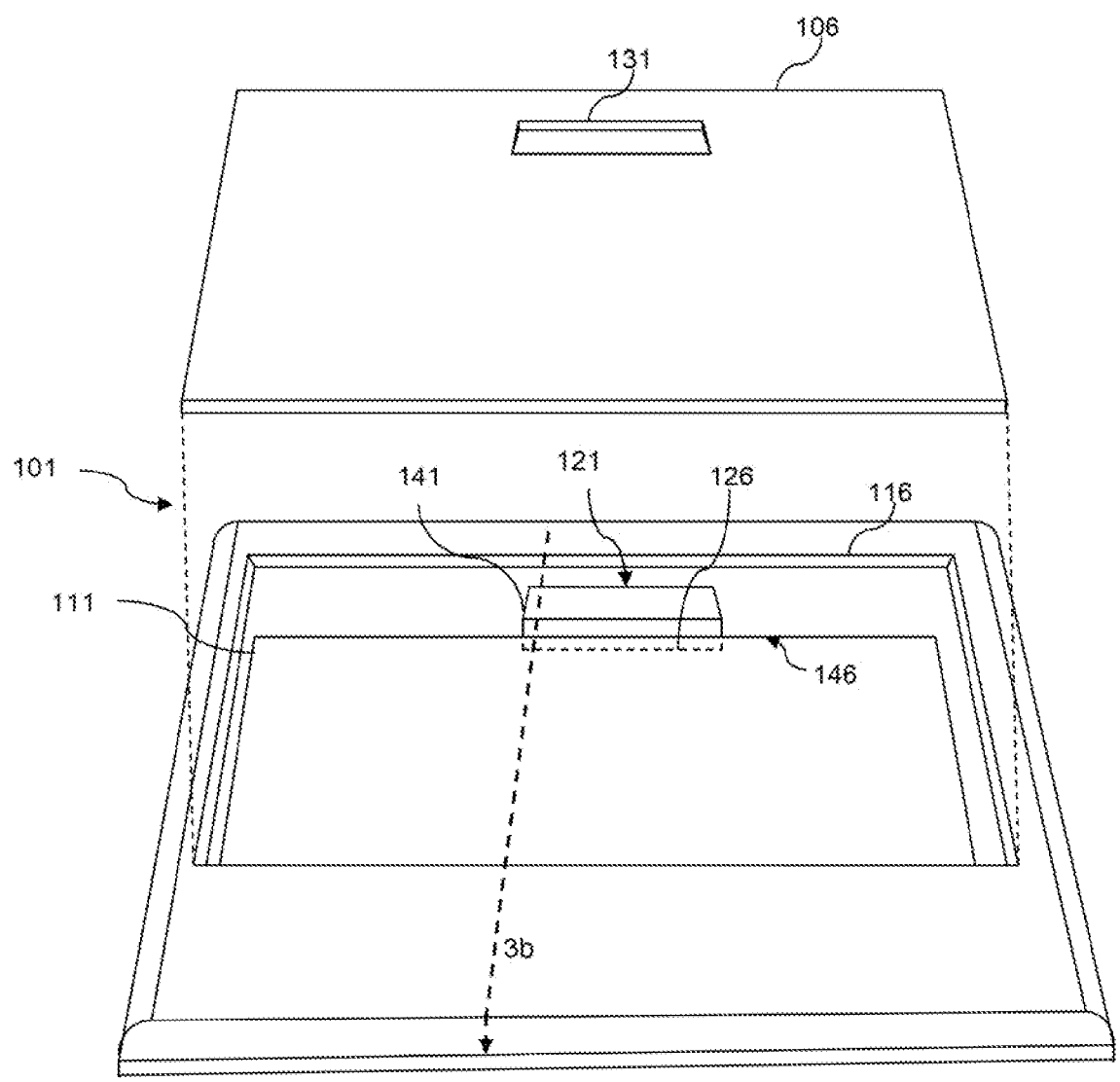

FIG. 1b is a bottom view of a computing device including a docking port according to an example implementation. The portable computing device 101 can include a printed circuit board 111. The portable computing device 101 includes a bottom 106 of a housing 116. A portion of the bottom 106 may be removable. The bottom 106 of the portable computing device 101 may include an opening 131. The opening 131 can align with the docking port 121 to allow a docking connector to connect to the docking port 121 through the opening 131.

The printed circuit board 111 includes an edge 146. A docking port 121 can be attached to the edge 146 of the printed circuit board 111. For example a top portion of the docking port 126 is above of the printed circuit board while a bottom portion of the docking port 141 is below the docking port 121. The docking port 121 can receive a docking connector from a docking station. If the docking port 121 is connected to a docking connector on a docking station the connector can pass by the edge of the printed circuit board so that the docking connector does not contact the printed circuit board if the portable computing device is attached to the docking station.

Figure 2A:
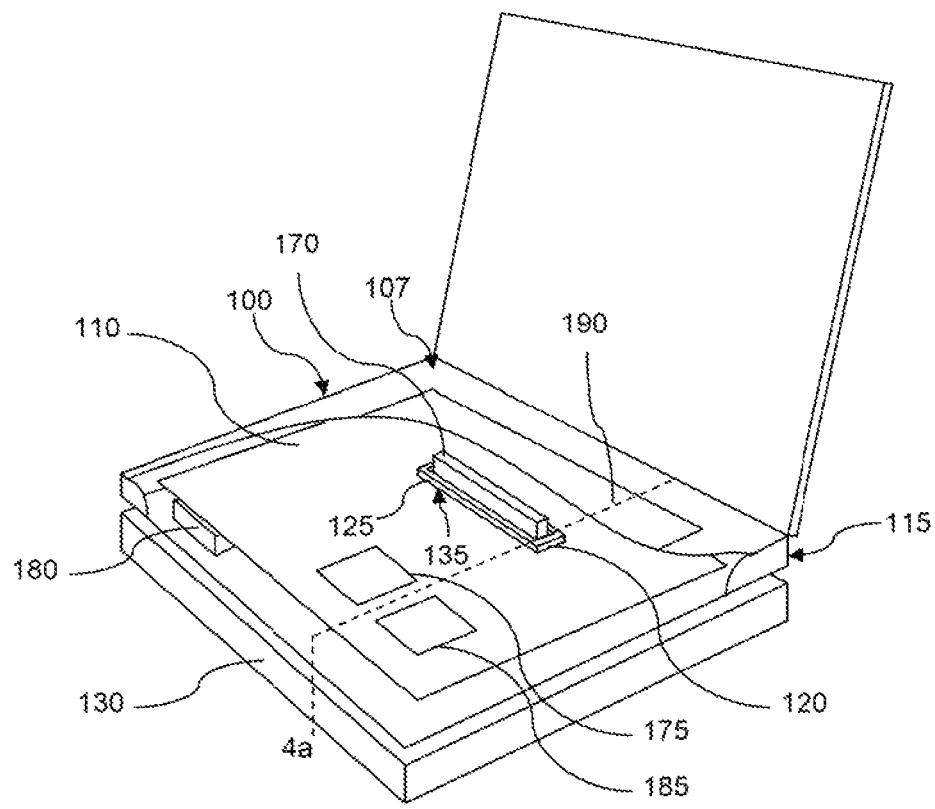
FIGS. 2a and 2b are a computing device and docking station according to an example implementation.

FIG. 2a is a cutaway top view portable computing device and docking station according to an example implementation. The portable computing device 100 is depicted with a portion of the top 107 of the housing 115 cutaway for viewing the printed circuit board 110, the docking port 120 and a docking connector 170.

The top portion of the docking port 125 has the docking connector 170 of the docking station 130 passing through the docking port 120. The docking port 120 is in the aperture 135 in the printed circuit board 110. The docking connector 170 is coupled to the docking station 130.

The printed circuit board 110 may include circuitry 175 to charge a battery 180 in the computing device. The circuitry to charge the battery may be connected to the docking port 120 to receive power from the docking connector 170 if the portable computing device is docked on the docking station.

The printed circuit board may include input/output (110) circuitry 185 wherein the I/O circuitry 185 is connected to the docking port 120. The I/O circuitry 185 may connect to the docking station to use I/O ports in the docking station or storage in the docking station.

The portable computing device 100 may include a component 190 opposite the opening in the housing 115. The component 190 may be an input device such as a keyboard or a touchpad on the top 107 of the housing. The component 190 may be for example a display if the portable computing device is tablet format or dual screen format clam shell format.

Figure 2B:
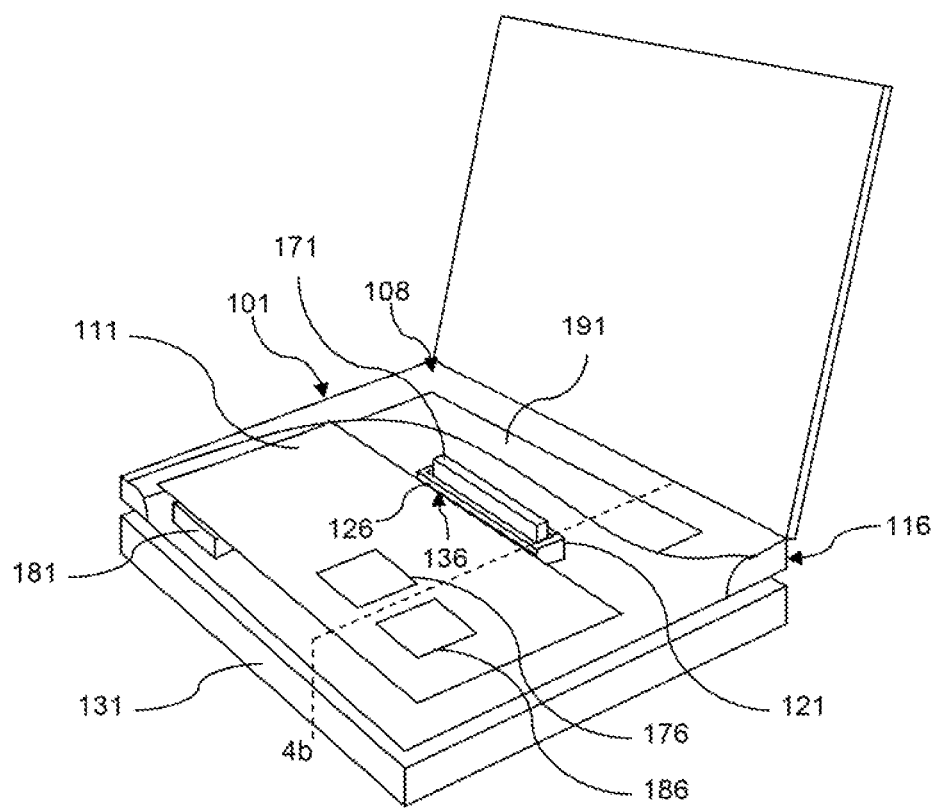

FIG. 2b is a cutaway top view portable computing device and docking station according to an example implementation. The portable computing device 100 is depicted with a portion of the top 108 of the housing 116 cutaway for viewing the printed circuit board 111, the docking port 121 and a docking connector 171.

The top portion of the docking port 126 has the docking connector 171 of the docking station 131 passing through the docking port 121. The top portion of the docking port 126 extends above the printed circuit board 111. The docking port 121 is coupled to the edge 146 of the printed circuit board 111. The docking connector 171 is coupled to the docking station 131.

The printed circuit board may include circuitry 176 to charge a battery 181 in the computing device. The circuitry to charge the battery may be connected to the docking port 121 to receive power from the docking connector 171 if the portable computing device is docked on the docking station.

The printed circuit board may include input/output (I/O) circuitry 186 wherein the I/O circuitry 186 is connected to the docking port 121. The I/O circuitry may connect to the docking station to use I/O ports in the docking station or storage in the docking station.

The portable computing device 101 may include a component 191 opposite the opening in the housing 116. The component 191 may be an input device such as a keyboard or a touchpad on the top 108 of the housing. The component 191 may be for example a display if the portable computing device is tablet format or dual screen format clam shell format.

Figure 3A:
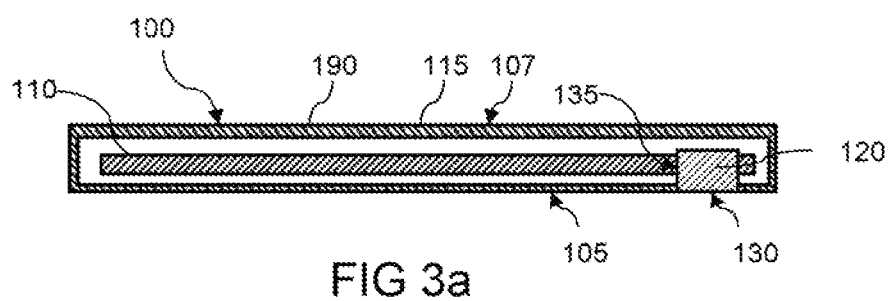
FIGS. 3a and 4a are a cross section of a computing device including a docking port in an aperture in the printed circuit board according to an example implementation.
Figure 4A:
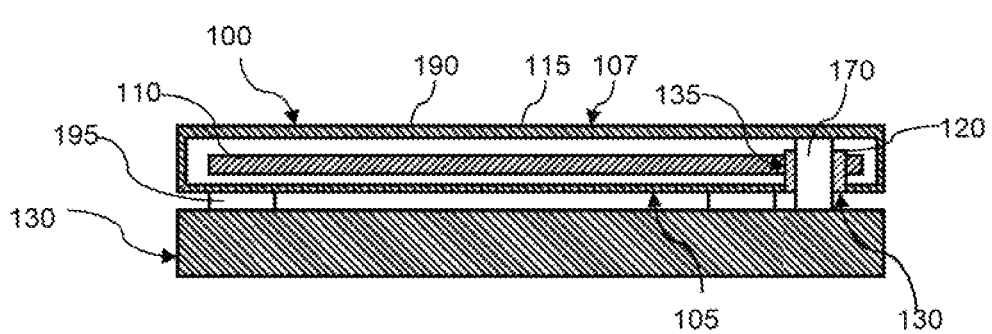

FIGS. 3a and 4a are a cross section of a computing device including a docking port according to an example implementation. The cross section of FIG. 3a is taken from 3a of FIG. 1a and the cross section of FIG. 4a is taken from 4a of FIG. 2. The computing device 100 can include a housing 115. The housing can include a top 107 and a bottom 105. A printed circuit board 110 can be between the top 107 and the bottom 105. The printed circuit board 110 can include an aperture 135 between the top 107 and an opening in the bottom. The portable computing device 100 can include a port 120 in the aperture 135. The port 120 can be electrically connected to logic on the printed circuit board 110. The logic may be for example an input/output (I/O) hub.

On the top 107 of the housing 115 may be a component 194 such as an input device such as a keyboard or touchpad or a display such as a touch screen display.

The docking station 130 can include a docking connector 170. The docking connector 170 can pass through the docking port 120. The docking connector 170 can pass through the aperture 135 in the printed circuit board 110. Between the portable computing device 100 and the docking station 130 may be a foot 195.

Figure 3B:
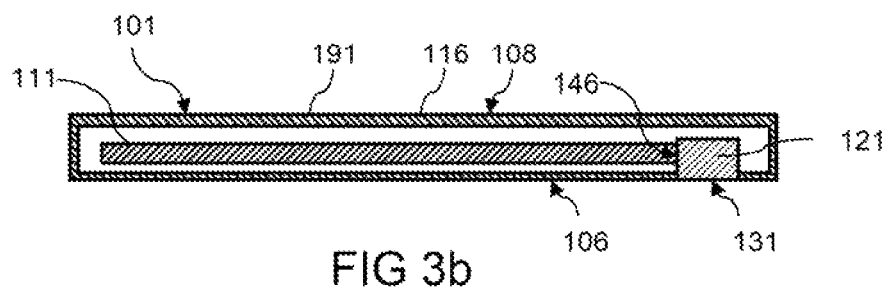
FIGS. 3b and 4b are a cross section of a computing device including a docking port coupled to the edge of the printed circuit board according to an example implementation.
Figure 4B:
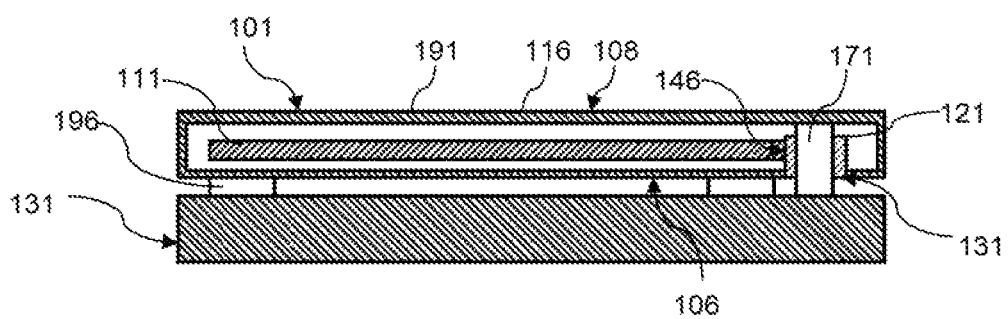

FIGS. 3b and 4b are a cross section of a computing device including a docking port according to an example implementation. The cross section of FIG. 3b is taken from 3b of FIG. 1b. The cross section of FIG. 4b is taken from 4b of FIG. 1b. The computing device 101 can include a housing 116. The housing can include a top 108 and a bottom 106. A printed circuit board 101 can be between the top 108 and the bottom 106. The printed circuit board 111 can include an edge 146. The printed circuit board is between the top 108 and the bottom 106. The portable computing device 101 can include a docking port 121 coupled to the edge 146 of the printed circuit board 111. The docking port 121 is between the top 108 and an opening 131 in the bottom 106 of the housing 116. The port 121 can be electrically connected to logic on the printed circuit board 111. The logic may be for example an input/output (I/O) hub.

On the top 108 of the housing 116 may be a component 191 such as an input device such as a keyboard or touchpad or a display such as a touch screen display.

The docking station 131 can include a docking connector 171. The docking connector 171 can pass through the docking port 121. Between the portable computing device 101 and the docking station 131 may be a foot 196.

Figure 5:
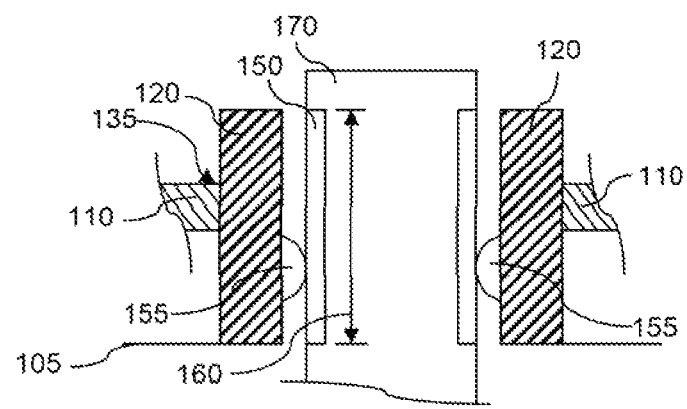
FIG. 5 is a cross section of a computing device including a docking port according to an example implementation.

FIG. 5 is a cross section of a computing device including a docking port according to an example implementation. The docking port 120 may be in the aperture 135 of the printed circuit board in one embodiment. The docking port 120 can include port contact 155. If the docking connector 170 is inserted in the docking port 120 the port contact 155 can make an electrical connection to connector contact 150. In one embodiment the contact swipe 160 of the connector contact 150 that is inserted into the docking port is longer than the distance between the bottom 105 of the portable computing device and the printed circuit board 110. For example if the distance between the bottom 105 of the portable computing device and the printed circuit board is 3 millimeters then the contact swipe 160 is be longer than 3 millimeters by allowing the docking connector to be inserted through the aperture 135 of the printed circuit board. The contact swipe is the distance that the docking connector can travel in the docking port and still make contact with the port connector.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   a printed circuit board including an aperture through the printed circuit board; and
   a docking port coupled to the printed circuit board and at least partially in the aperture through the printed circuit board, to receive a docking connector from a docking station,
   wherein if the computing device is coupled to the docking station the docking connector extends through the aperture in the printed circuit board.

2. The computing device of claim 1, further comprising circuitry to charge a battery in the computing device, wherein the circuitry is connected to the docking port.

3. The computing device of claim 2, further comprising input/output (I/O) circuitry wherein the I/O circuitry is connected to the docking port.

4. The computing device of claim 1, further comprising a housing enclosing the printed circuit board and the docking port.

5. The computing device of claim 4, wherein the housing includes an opening aligned with the docking connector.

6. The computing device of claim 1, further comprising a contact swipe distance that is greater than a distance between the bottom of the computing device and the printed circuit board.

7. A computing device comprising:
   a housing including a top and a bottom;
   a printed circuit board between the top and the bottom, wherein the printed circuit board includes an aperture between the top and an opening in the bottom; and
   a docking port disposed in the aperture, the docking port to receive a docking connector from a docking station,
   wherein if the computing device is coupled to the docking station, the docking connector extends through the aperture in the printed circuit board.

8. The computing device of claim 7, wherein the docking port in the aperture is electrically connected to logic on the printed circuit board.

9. The computing device of claim 7, wherein the top of the housing contacts a docking connector received by the docking port.

10. The computing device of claim 7, further comprising an input device in the top.

11. The computing device of claim 7, further comprising a display in the top.

12. A computing device comprising:
    a housing including a top and a bottom includes an opening;
    a printed circuit board with an edge, wherein the printed circuit board is between the top and the bottom; and
    a docking port attached to the edge of the printed circuit board and aligned with the opening, the docking port to receive a docking connector from a docking station,
    wherein if the computing device is coupled to the docking station, the docking connector extends into the docking port past the printed circuit board.

13. The computing device of claim 12, further comprising a battery connected to the docking port to receive power from the docking station.

14. The computing device of claim 13, further comprising a hub connected to the docking port.

* * * * *